(12) United States Patent
Okamoto

(10) Patent No.: US 11,527,262 B2
(45) Date of Patent: Dec. 13, 2022

(54) DISK DEVICE HAVING A MULTI-ACTUATOR ASSEMBLY WITH A PROTECTIVE MEMBER ATTACHED TO THE TIP OF AN ACTUATOR ARM

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Makoto Okamoto, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/407,480

(22) Filed: Aug. 20, 2021

(65) Prior Publication Data
US 2022/0262394 A1    Aug. 18, 2022

(30) Foreign Application Priority Data

Feb. 17, 2021    (JP) .............................. JP2021-023327

(51) Int. Cl.
*G11B 5/48*    (2006.01)
*G11B 5/55*    (2006.01)
(Continued)

(52) U.S. Cl.
CPC ............ *G11B 5/4813* (2013.01); *G11B 5/012* (2013.01); *G11B 5/4833* (2013.01);
(Continued)

(58) Field of Classification Search
CPC ..... G11B 5/4813; G11B 5/012; G11B 5/4833; G11B 5/4846; G11B 5/4886; G11B 5/5578; G11B 25/043
See application file for complete search history.

(56) References Cited

U.S. PATENT DOCUMENTS

| 4,544,972 A | 10/1985 | Kogure et al. |
| 5,831,793 A * | 11/1998 | Resh .................... G11B 5/4826 360/244.8 |

(Continued)

FOREIGN PATENT DOCUMENTS

JP    08-203224 A    8/1996

*Primary Examiner* — Brian E Miller
(74) *Attorney, Agent, or Firm* — Kim & Stewart LLP

(57) ABSTRACT

A disk device includes a plurality of magnetic disks, a plurality of magnetic heads, a first actuator assembly having a plurality of arms and a plurality of suspension assemblies for the magnetic heads and supported to be rotatable about a support shaft, a second actuator assembly having a plurality of arms and a plurality of suspension assemblies for the magnetic heads and supported to be rotatable about the support shaft, and a protective member formed from a material different from a material for the arms. The protective member is provided on a tip end portion of at least one of a first arm closest to the second actuator assembly among the of arms in the first actuator assembly and a second arm closest to the first actuator assembly among the arms in the second actuator assembly.

14 Claims, 6 Drawing Sheets

(51) Int. Cl.
  *G11B 25/04* (2006.01)
  *G11B 5/012* (2006.01)

(52) U.S. Cl.
  CPC .......... *G11B 5/4846* (2013.01); *G11B 5/4886* (2013.01); *G11B 5/5578* (2013.01); *G11B 25/043* (2013.01)

(56) References Cited

U.S. PATENT DOCUMENTS

| | | | | |
|---|---|---|---|---|
| 6,498,704 B1* | 12/2002 | Chessman | ............... | G11B 33/08 |
| 6,556,383 B2* | 4/2003 | Murphy | ............... | G11B 5/4826 |
| | | | | 360/244.9 |
| 6,714,386 B1* | 3/2004 | Polycarpou | .......... | G11B 5/4833 |
| | | | | 360/265.1 |
| 6,972,926 B1* | 12/2005 | Codilian | ............... | G11B 33/121 |
| | | | | 360/99.15 |
| 7,064,932 B1 | 6/2006 | Lin et al. | | |
| 7,468,865 B2* | 12/2008 | Yang | .................... | G11B 5/4826 |
| | | | | 360/244.8 |
| 7,697,240 B2* | 4/2010 | Funabashi | ............ | G11B 5/4833 |
| | | | | 360/266 |
| 7,983,008 B2 | 7/2011 | Liao et al. | | |
| 10,186,286 B2* | 1/2019 | Keshavan | ............ | G11B 5/5521 |
| 10,192,575 B1* | 1/2019 | Resh | ...................... | G11B 21/02 |
| 10,332,555 B1* | 6/2019 | Keshavan | ............ | G11B 5/5578 |
| 10,475,475 B2* | 11/2019 | Hasegawa | ............ | G11B 5/4846 |
| 10,522,175 B1* | 12/2019 | Horgan | ................ | G11B 5/5578 |
| 10,657,993 B1* | 5/2020 | Uehara | ................ | G11B 25/043 |
| 10,891,980 B1* | 1/2021 | Keshavan | ............ | G11B 25/043 |
| 2001/0030837 A1* | 10/2001 | Murphy | ............... | G11B 5/4813 |
| | | | | 360/244.9 |
| 2015/0287428 A1* | 10/2015 | Kerner | ...................... | B32B 7/12 |
| | | | | 428/411.1 |
| 2018/0358039 A1* | 12/2018 | Keshavan | ............ | G11B 5/5521 |
| 2018/0374513 A1* | 12/2018 | Keshavan | ............ | G11B 5/4813 |
| 2019/0287558 A1* | 9/2019 | Hasegawa | ............ | G11B 5/4813 |
| 2022/0084553 A1* | 3/2022 | Tokizaki | ............ | G11B 5/4813 |

\* cited by examiner

DISK DEVICE HAVING A MULTI-ACTUATOR ASSEMBLY WITH A PROTECTIVE MEMBER ATTACHED TO THE TIP OF AN ACTUATOR ARM

CROSS-REFERENCE TO RELATED APPLICATION(S)

This application is based upon and claims the benefit of priority from Japanese Patent Application No. 2021-023327, filed Feb. 17, 2021, the entire contents of which are incorporated herein by reference.

FIELD

Embodiments described herein relate generally to a disk device.

BACKGROUND

A disk device, for example, a hard disk drive (HDD), is configured with magnetic disks, a spindle motor supporting the magnetic disks and driving the magnetic disks to rotate, a head actuator supporting magnetic heads, a voice coil motor driving this head actuator, and the like, all of which are provided within a casing. The head actuator has an actuator block having a plurality of arms and suspension assemblies, which are often referred to as "head gimbal assemblies (HGAs)," each mounted to an arm and each supporting one magnetic head.

In recent years, the number of magnetic disks provided in the HDD is on the increase with an increase in a storage capacity of the HDD. To deal with many magnetic disks, a so-called multi-actuator or a split actuator which is configured such that a head actuator is split into a plurality of, for example, two head actuators capable of being independently rotated and such that the two head actuators are stacked, has been developed.

DETAILED DESCRIPTION

Figure 1:
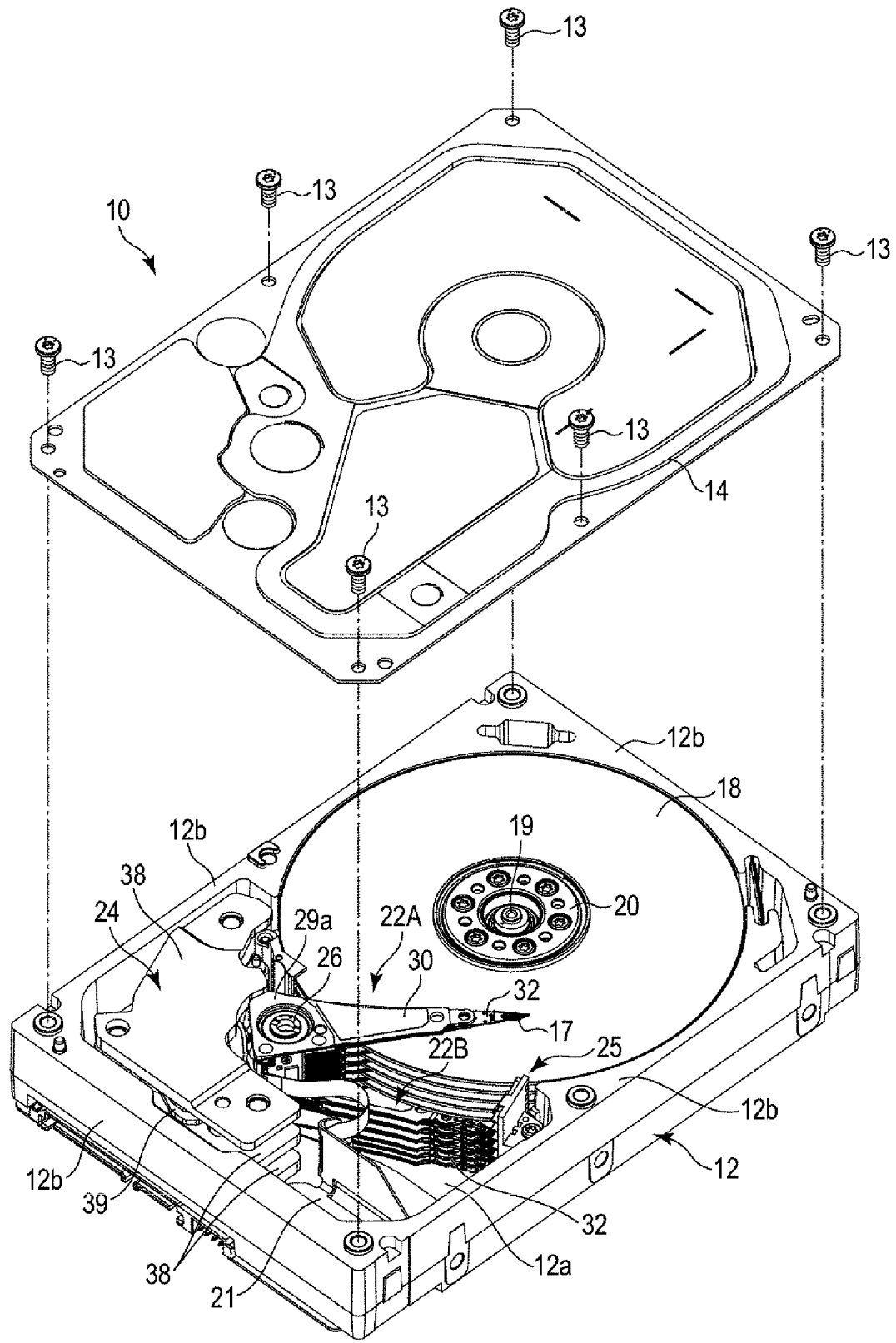
FIG. 1 is an exploded perspective view of a hard disk drive (HDD) according to a first embodiment, with a top cover detached.

Embodiments provide a disk device capable of preventing contact between arms in head actuators and improving reliability.

In general, according to one embodiment, a disk device includes: a plurality of disk-like recording media each of which is rotatable; a plurality of heads processing information to and from the recording media; a first actuator assembly having a first actuator block that is supported to be rotatable about a support shaft, a plurality of arms that extend from the first actuator block, and a plurality of suspension assemblies each of which is mounted to a tip end portion of each of the arms and each of which supports one of the heads; a second actuator assembly having a second actuator block that is supported to be rotatable about the support shaft and that is separated from the first actuator block by a gap, a plurality of arms that extend from the second actuator block, and a plurality of suspension assemblies each of which is mounted to the tip end portion of each of the arms and each of which supports one of the heads; and a protective member that is provided on the tip end portion of at least one of a first arm, which is one of the arms that extend from the first actuator block that is closest to the second actuator assembly and a second arm, which is one of the arms that extend from the second actuator block that is closest to the first actuator assembly, and that is formed from a material different from a material for the arms.

Disk devices according to embodiments will be described hereinafter with reference to the drawings.

It is noted that the disclosure is only an example. Consequently, changes may be made as appropriate within the spirit of the disclosure and changes that could be easily conceived of by a person having ordinary skill in the art are encompassed in the scope of the disclosure. Furthermore, widths, thicknesses, shapes, and the like of portions in the drawings are often expressed schematically, compared with actual widths, thicknesses, shapes, and the like for the purpose of making descriptions clearer, and the drawings are only an example and not intended to limit the interpretation of the disclosure. Moreover, in the present specification and each drawing, similar elements to those described previously with reference to the drawings already referred to are denoted by the same reference signs and detailed descriptions thereof are often omitted as appropriate.

First Embodiment

A hard disk drive (HDD), which is an example of a disk device, according to a first embodiment will be described in detail.

FIG. 1 is an exploded perspective view of the HDD according to the first embodiment, with a top cover detached.

The HDD is configured with a flat and generally rectangular casing 10. The casing 10 has a rectangular box-like base 12 having an upper opening and a top cover 14. The base 12 has a rectangular bottom wall 12a that is opposed to the top cover 14 across a gap and a plurality of side walls 12b provided upright along a periphery of the bottom wall 12a, and the bottom wall 12a and the side walls 12b are formed integrally from, for example, aluminum. The top cover 14 is formed into a rectangular plate shape from, for example, stainless steel. The top cover 14 is screwed into the side walls 12b of the base 12 by a plurality of screws 13 and blocks the upper opening of the base 12.

Within the casing 10, a plurality of, for example, ten magnetic disks 18 serving as recording mediums and a spindle motor 19 serving as a drive portion and supporting and rotating the magnetic disks 18 are provided. The spindle motor 19 is provided on the bottom wall 12a. Each magnetic disk 18 has, for example, a diameter of 96 mm, which is approximately 3.5 inches, and a thickness of approximately 0.5 mm, and has a magnetic recording layer on each of or one of an upper surface and a lower surface thereof. The magnetic disks 18 are each coaxially fitted into a hub, not shown, of the spindle motor 19, and clamped by a clamp spring 20 and fixed to the hub. By way of example, the ten magnetic disks 18 are stacked in parallel to one another at predetermined intervals. The magnetic disks 18 are supported in a state of being located in parallel to the bottom wall 12a of the base 12. The magnetic disks 18 are each rotated at a predetermined revolving speed by the spindle motor 19.

It is noted that the number of the magnetic disks 18 is not limited to ten and may be smaller than or larger than ten.

Within the casing 10, a plurality of magnetic heads 17 each recording and reproducing information to and from each of the magnetic disks 18, and a head actuator assembly, which is often referred to as a "head actuator," supporting these magnetic heads 17 in a freely movable fashion with respect to the magnetic disks 18 are provided. In the present embodiment, the head actuator assembly is configured as a multi-actuator assembly that is split into a plurality of actuator assemblies, for example, a first actuator assembly 22A and a second actuator assembly 22B. The first and second actuator assemblies 22A and 22B are supported to be rotatable about a common support shaft (rotating shaft) 26 provided upright on the bottom wall 12a of the base 12.

Within the casing 10, voice coil motors (VCMs) 24 that rotate and position the first and second actuator assemblies 22A and 22B, respectively, a ramp load mechanism 25 that holds each magnetic head 17 at an unload position apart from each magnetic disk 18 when the magnetic head 17 moves to an outermost circumference of the magnetic disk 18, and an interconnection board unit (described below as an FPC unit) 21 on which electronic components such as a conversion connector are mounted are provided.

A printed circuit board, not shown, is screwed onto an outer surface of the bottom wall 12a. The printed circuit board includes a controller, and this controller exercises control over the movement of the spindle motor 19, and the movements of the VCMs 24 and the magnetic heads 17 via the interconnection board unit 21.

Figure 2:
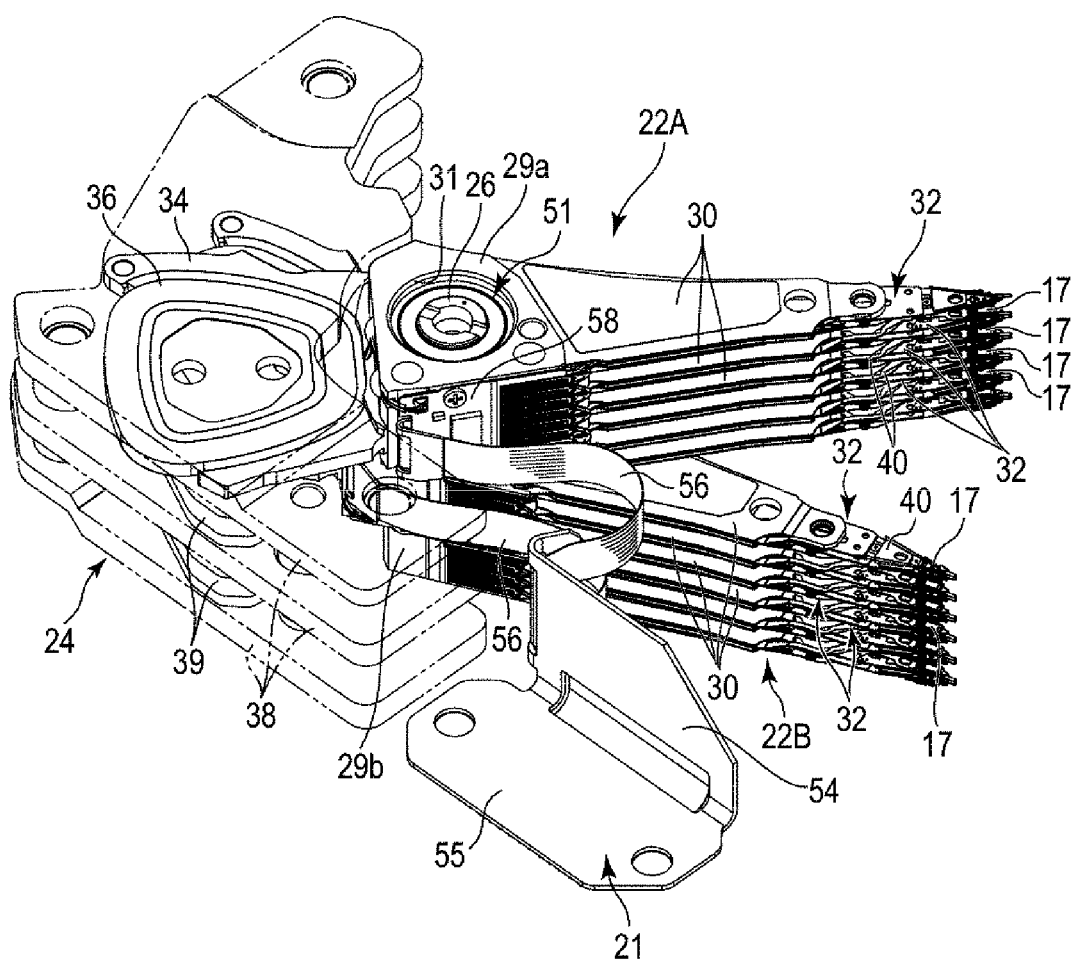
FIG. 2 is a perspective view showing actuator assemblies and an interconnection board unit of the HDD.
Figure 3:
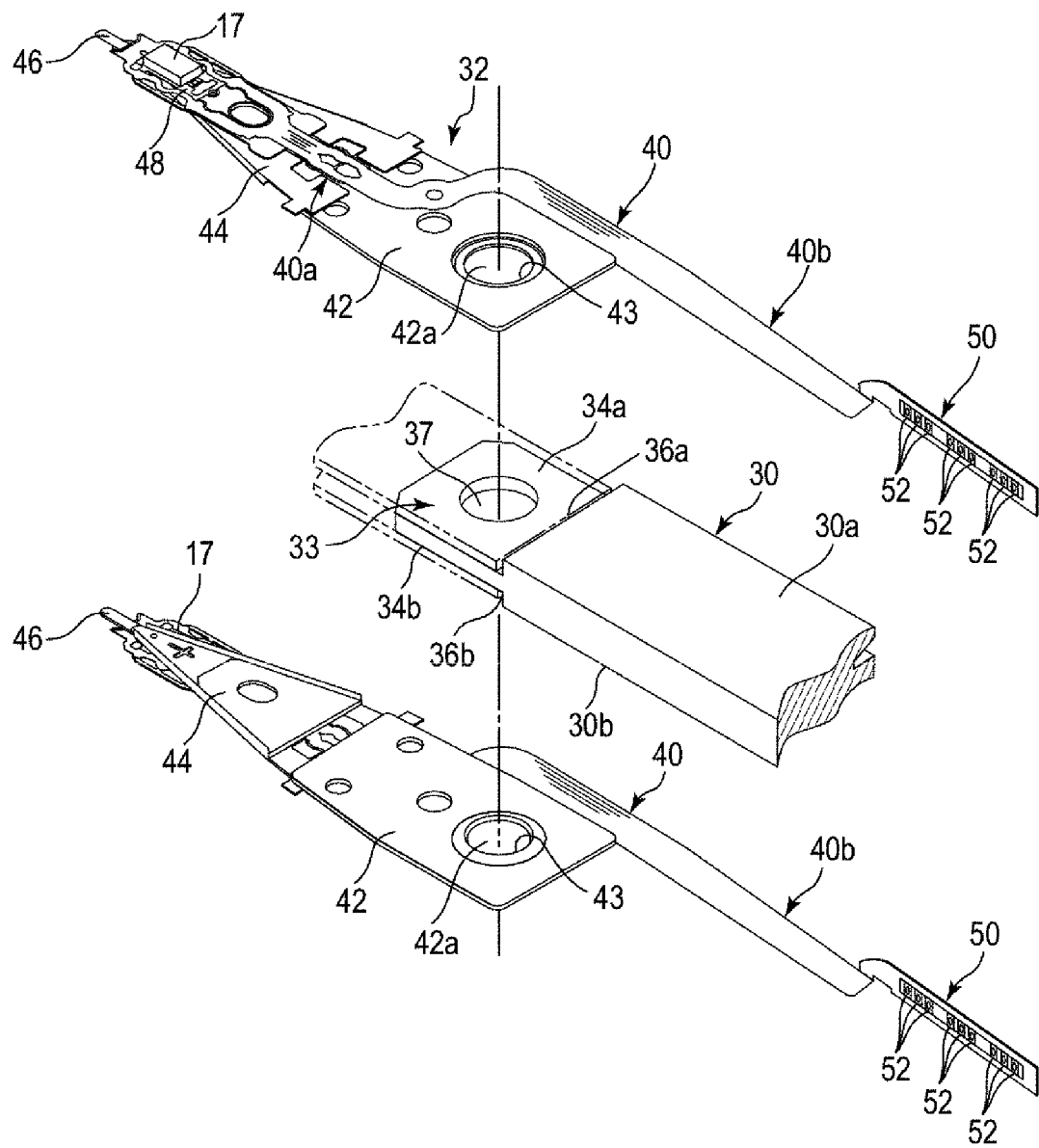
FIG. 3 is a perspective view showing an arm and suspension assemblies in each of the actuator assemblies.
Figure 4:
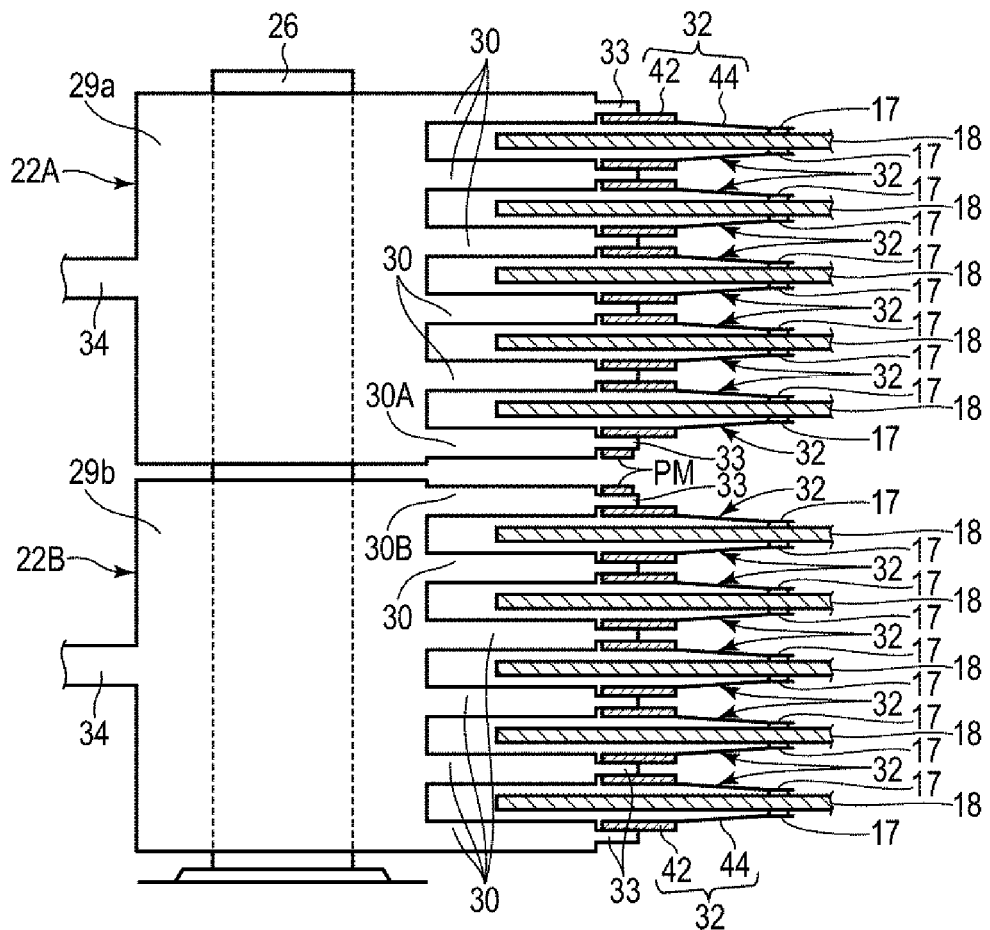
FIG. 4 is a side view schematically showing the actuator assemblies in an aligned state.

FIG. 2 is a perspective view showing the multi-actuator assembly and the interconnection board unit, FIG. 3 is a schematic perspective view of one arm and suspension assemblies, and FIG. 4 is a schematic side view of the multi-actuator assembly in an aligned state.

As shown in FIGS. 2 and 3, the multi-actuator assembly has the first actuator assembly 22A and the second actuator assembly 22B. The first and second actuator assemblies 22A and 22B are disposed in such a manner that the first actuator assembly 22A is superimposed on the second actuator assembly 22B, and is independently rotatable about the common support shaft 26 provided upright on the bottom wall 12a of the base 12. The first actuator assembly 22A and the second actuator assembly 22B are configured to be generally identical in structure. By way of example, the actuator assembly disposed on an upper side in an axial direction of the support shaft 26 is referred to as the "first actuator assembly 22A," and the actuator assembly disposed on a lower side in the axial direction thereof is referred to as the "second actuator assembly 22B."

The first actuator assembly 22A includes an actuator block (referred to herein as a first actuator block) 29a, six arms 30 extending from the actuator block 29a, head suspension assemblies (also referred to as "head gimbal assemblies (HGAs)") 32 mounted to the arms 30, and the magnetic heads 17 supported by the head suspension assemblies 32. The actuator block 29a has an inner hole 31 and a bearing unit (unit bearing) 51 is attached to this inner hole 31. The actuator block 29a is supported to be rotatable about the support shaft 26 via the bearing unit 51.

In the present embodiment, the actuator block 29a and the six arms 30 are formed integrally from aluminum or the like and configure a so-called E block. The arms 30 are each formed into, for example, a slim flat plate shape and extend from the actuator block 29a in a direction orthogonal to the support shaft 26. The six arms 30 are aligned in the axial direction of the support shaft 26 and provided in parallel to one another at gaps given therebetween. In the present embodiment, the six arms 30 are formed identical in dimensions and shape.

The first actuator assembly 22A has a support frame 34 extending from the actuator block 29a in a direction opposite to the arms 30. A voice coil 36 is supported by the support frame 34. As shown in FIGS. 1 and 2, the voice coil 36 is located between a pair of yokes 38 provided on the base 12, and the voice coil 36, these yokes 38, and a magnet 39 fixed to any of the yokes 38 configure one VCM 24.

The first actuator assembly 22A is configured with ten head suspension assemblies 32 and these head suspension assemblies 32 are mounted to extension ends of the arms 30.

As shown in FIG. 3, each arm 30 is formed into a plate shape that has a first principal surface 30a and a second principal surface 30b parallel to and opposed to the first principal surface 30a. A thin caulking portion (which is more generally a fixation portion) 33 is formed on the extension end (in the tip end portion) of each arm 30. That is, the caulking portion 33 has a first installation surface 34a that descends by one step from the first principal surface 30a, and a stepped portion 36a is formed between the first principal surface 30a and the first installation surface 34a. The caulking portion 33 has a second installation surface 34b that descends by one step from the second principal surface 30b, and a stepped portion 36b is formed between the second principal surface 30b and the second installation surface 34b. The second installation surface 34b is parallel to and opposed to the first installation surface 34a. The caulking portion 33 has a circular caulking hole 37 formed by penetrating the first installation surface 34a and the second installation surface 34b. By way of example, a thickness of each arm 30 is set to approximately 0.78 mm, and heights of the stepped portions 36a and 36b are set to approximately 0.1 mm. A thickness of the caulking portion 33 is set to approximately 0.5 mm.

Each head suspension assembly 32 is configured with a suspension that functions as a support plate and an interconnection member (flexure) 40 disposed on the suspension.

The suspension has a rectangular base plate 42 made of a metal plate with a thickness of several hundred micrometers and a slim plate spring-like load beam 44 made of a metal plate with a thickness of several tens of micrometers. The base plate 42 and the load beam 44 are formed from, for example, stainless steel. By way of example, the base plate 42 has the thickness of approximately 150 μm and the load beam 44 has the thickness of approximately 25 to 30 μm.

A base end portion of the load beam 44 is superimposed on a tip end portion of the base plate 42, and the load beam 44 is fixed to the base plate 42 by welding a plurality of locations of the load beam 44. The base end portion of the load beam 44 has a width generally equal to a width of the base plate 42. A rod-like tab 46 projects from a tip end of the load beam 44.

A base end portion of the base plate 42 has a circular opening 42a and an annular projection portion 43 located around this opening 42a. The base plate 42 is fastened to the tip end portion of each arm 30 by fitting the projection portion 43 into the caulking hole 37 of the caulking portion 33 and caulking the projection portion 43 in a state of disposing the base end portion of the base plate 42 on either the first installation surface 34a or the second installation surface 34b of the caulking portion 33 of the arm 30.

It is noted that the base end portion of the base plate 42 may be fixed onto either the first installation surface 34a or the second installation surface 34b of the caulking portion 33 of each arm 30 not only by caulking but also by laser welding, spot welding, or adhesive bonding.

The flexure 40 has a metal plate such as a stainless steel plate (which is more generally a backing layer), an insulating layer formed on the metal plate, a conductive layer formed on the insulating layer and configuring a plurality of interconnections, i.e., an interconnection pattern, and a cover layer (which is a protective layer or an insulating layer) covering the conductive layer, and the flexure 40 is formed into a slim strip-like stacked plate. The flexure 40 has a tip end side portion 40a and a base end side portion 40b. The tip end side portion 40a is placed on the load beam 44 and the base plate 42. The base end side portion 40b extends outward from a side edge of the base plate 42 and further extends to the base end portion of each arm 30 along the arm 30.

Part of the tip end side portion 40a includes a displaceable gimbal portion (which is more generally an elastic support portion) 48. The gimbal portion 48 is located on the load beam 44. Each magnetic head 17 is placed on the gimbal portion 48. Interconnections of the flexure 40 are electrically connected to a read element, a write element, a heater, and other members of the magnetic head 17.

The base end side portion 40b of the flexure 40 extends outward from the side edge of the base plate 42 and then extends to the actuator block 29a along a side surface of each arm 30. A connection end portion (also referred to as a tail connection terminal portion) 50 of the flexure 40 is formed on a rear end of the base end side portion 40b. A plurality of connection terminals (also referred to as connection pads) 52 are provided in the connection end portion 50. These connection terminals 52 are connected to the interconnections of the flexure 40, respectively. The connection end portion 50 is joined to a joint portion (e.g., an interconnection board) 58 of a flexible printed circuit board (FPC) provided on an installation surface of the actuator block 29a. Each magnetic head 17 is thereby electrically connected to the FPC via the flexure 40.

As shown in FIGS. 2 and 4, the first actuator assembly 22A is configured with the ten head suspension assemblies 32, and these head suspension assemblies 32 are mounted to the extension ends (caulking portions 33) of the arms 30. The plurality of head suspension assemblies 32 include upward-head suspension assemblies each supporting one magnetic head 17 upward and downward-head suspension assemblies each supporting one magnetic head 17 downward. These upward-head and downward-head suspension assemblies are each configured by disposing the head suspension assembly of the same structure while turning the head suspension assembly upside down. In the present embodiment, in the first actuator assembly 22A, only the downward-head suspension assembly is mounted to the axially uppermost arm 30. More specifically, the base plate 42 of the head suspension assembly 32 is fixed to the second installation surface, i.e., lower installation surface, 36b of the caulking portion 33. Only the upward-head suspension assembly is mounted to the axially lowermost arm 30, which is hereinafter referred to as "arm 30A," that is, the arm 30A most adjacent to the second actuator assembly 22B. More specifically, the base plate 42 of the head suspension assembly 32 is fixed to the first installation surface 34a of the caulking portion 33, that is, the installation surface 34a opposite to the second actuator assembly 22B.

Two head suspension assemblies 32 including one upward-head suspension assembly and one downward-head suspension assembly are mounted to each of the four other arms 30. The head suspension assemblies 32 are fixed to the first installation surface 34a and the second installation surface 34b of the caulking portion 33 of each of the four other arms 30, respectively.

The ten head suspension assemblies 32 extend from the six arms 30 and are apart from one another at predetermined intervals. The two magnetic heads 17 supported by a pair of upper and lower head suspension assemblies 32, i.e., the downward-head suspension assembly 32 and the upward-head suspension assembly 32 are located face-to-face to be apart from each other at predetermined intervals. These magnetic heads 17 are located to be opposed to both sides of the corresponding magnetic disk 18.

On the other hand, the second actuator assembly 22B is generally identical in configurations to the first actuator assembly 22A. That is, as shown in FIGS. 2 and 4, the second actuator assembly 22B has an actuator block (also referred to herein as a second actuator block) 29b incorporating therein the bearing unit 51, the six arms 30 extending from the actuator block 29b, the ten head suspension assemblies 32 mounted to the arms 30, the magnetic heads 17 placed on the head suspension assemblies 32, respectively, and the support frame 34 supporting the voice coil 36.

The actuator block 29b is supported to be rotatable about the support shaft 26 via the bearing unit 51. The actuator block 29b is supported by a base end portion, i.e., half portion closer to the bottom wall 12a of the support shaft 26 and disposed below the first actuator block 29a coaxially. The actuator block 29b is opposed to the first actuator block 29a across a small gap.

The actuator block 29b and the six arms 30 are formed integrally from aluminum or the like and configure a so-called E block. The arms 30 are each formed into, for example, the slim flat plate shape and extend from the actuator block 29b in the direction orthogonal to the support shaft 26. The six arms 30 are provided in parallel to one another at gaps given therebetween. In the present embodiment, the six arms 30 in the second actuator assembly 22B are formed identical in dimensions and shape to the arms 30 in the first actuator assembly 22A.

The lowermost arm 30A in the first actuator assembly 22A and the axially uppermost arm 30, which is hereinafter referred to as "uppermost arm 30B," in the second actuator assembly 22B are located most adjacently in a boundary between the first actuator assembly 22A and the second actuator assembly 22B. That is, the uppermost arm 30B is most adjacent to the first actuator assembly 22A. The lowermost arm 30A and the uppermost arm 30B are generally in parallel to and opposed to each other at predetermined intervals of, for example, 0.4 mm.

In the second actuator assembly 22B, only the downward-head suspension assembly 32 is mounted to the axially uppermost arm 30B. More specifically, the base plate 42 of the head suspension assembly 32 is fixed to the second installation surface, i.e., lower installation surface 34b of the caulking portion 33, that is, the second installation surface 34b opposite to the first actuator assembly 22A. Only the upward-head suspension assembly 32 is mounted to the axially lowermost arm 30. More specifically, the base plate 42 of the head suspension assembly 32 is fixed to the first installation surface, i.e., upper installation surface, 36a of the caulking portion 33.

Two head suspension assemblies 32 including one upward-head suspension assembly and one downward-head suspension assembly are mounted to each of the four other arms 30. The head suspension assemblies 32 are fixed to the first installation surface 34a and the second installation surface 34b of the caulking portion 33 of each of the four other arms 30, respectively.

The ten head suspension assemblies 32 extend from the six arms 30 and are apart from one another at predetermined intervals. The two magnetic heads 17 supported by a pair of upper and lower head suspension assemblies 32, i.e., the downward-head suspension assembly 32 and the upward-head suspension assembly 32 are located face-to-face and apart from each other at predetermined intervals. These magnetic heads 17 are located to be opposed to both sides of the corresponding magnetic disk 18.

As shown in FIG. 2, the voice coil 36 supported by the support frame 34 extending from the actuator block 29b is located between a pair of yokes 38 provided on the base 12, and the voice coil 36, these yokes 38, and the magnet 39 fixed to any of the yokes 38 configure one VCM 24.

The VCM 24 that drives the first actuator assembly 22A and the VCM 24 that drives the second actuator assembly 22B are provided independently of each other. It is thereby possible to rotate the first actuator assembly 22A and the second actuator assembly 22B about the support shaft 26, independently of each other. The first actuator assembly 22A accesses five upper magnetic disks 18 by being rotated. The second actuator assembly 22B accesses five lower magnetic disks 18 by being rotated.

As shown in FIG. 2, the FPC unit 21 has a generally rectangular base portion 54, two slim strip-like relay portions 56 extending from one side edge of the base portion 54, and two joint portions, i.e., a first interconnection board and a second interconnection board, 58 provided continuously on tip ends of the relay portions 56, respectively in an integral fashion. The base portion 54, the relay portions 56, and the joint portions 58 are formed from the flexible printed circuit board (FPC). The flexible printed circuit board (FPC) has an insulating layer made of polyimide or the like, a conductive layer that is formed on this insulating layer and that forms interconnections, connection pads, and the like, and a protective layer that covers the conductive layer.

Electronic components such as a conversion connector and a plurality of capacitors, not shown, are mounted on the base portion 54 and electrically connected to interconnections, not shown. A metal plate 55 that functions as a reinforcement plate is adhered onto the base portion 54. The base portion 54 is provided on the bottom wall 12a of the base 12. The two relay portions 56 extend from the side edge of the base portion 54 toward the first and second actuator assemblies 22A and 22B, respectively. The joint portions 58 provided on extension ends of the relay portions 56 are each adhered onto one side surface, i.e., installation surface of the actuator block 29a or 29b via a backing plate, not shown, and further fixedly screwed onto the installation surface by a fixation screw.

The connection end portion 50 of the flexure 40 in each head suspension assembly 32 described above is superimposed on one joint portion 58 and electrically and mechanically connected to the joint portion 58. The ten magnetic heads 17 in the first actuator assembly 22A and the ten magnetic heads 17 in the second actuator assembly 22B are thereby electrically connected to the base portion 54 each via the interconnections of the flexure 40 and the joint portion 58 and the relay portion 56 of the FPC unit 21. Moreover, the base portion 54 is electrically connected to the printed circuit board provided on a bottom surface side of the casing 10 via the conversion connector.

Figure 5:
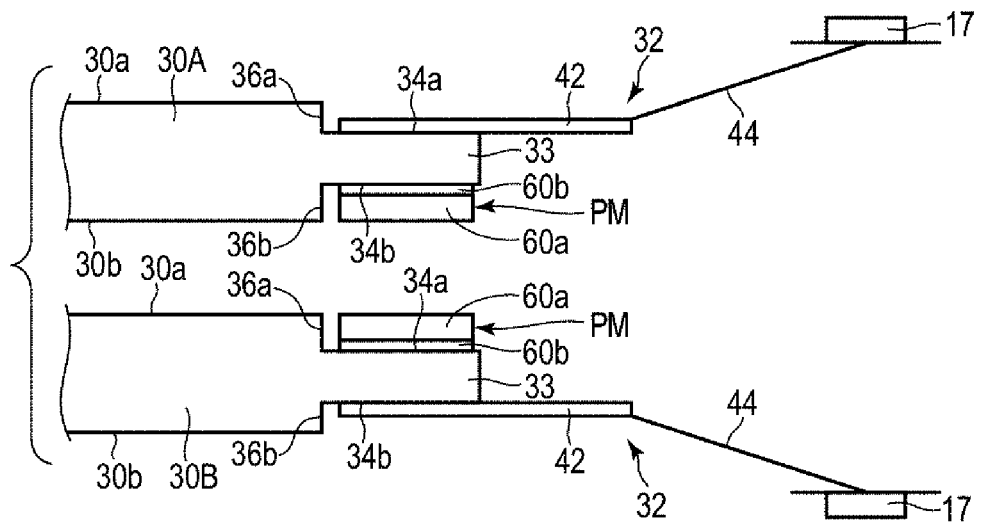
FIG. 5 is a side view schematically showing tip end portions of two arms opposed to each other as well as suspension assemblies.

FIG. 5 is an enlarged side view of the lowermost arm 30A in the first actuator assembly 22A and the uppermost arm 30B in the second actuator assembly 22B.

As shown in FIGS. 4 and 5, the actuator assembly is configured with a protective member PM provided in the tip end portion of at least one of the lowermost arm 30A (also referred to herein as a first arm) most adjacent to the second actuator assembly 22B among the plurality of arms 30 in the first actuator assembly 22A and the uppermost arm 30B (also referred to herein as a second arm) most adjacent to the first actuator assembly 22A among the plurality of arms 30 in the second actuator assembly 22B. In the present embodiment, the protective member PM is provided in the caulking portion 33 of each of the arms 30A and 30B.

As shown in FIG. 5, in the lowermost arm 30A, the protective member PM is provided on the installation surface located outside, i.e., second installation surface 34b opposed to the arm 30B out of the installation surfaces 34a and 34b of the caulking portion 33. The protective member PM includes a member main body 60a formed from a material, e.g., resin different from a material for forming the arms 30, and an adhesive layer 60b such as a double-sided tape, and the member main body 60a is adhered onto the second installation surface 34b by the adhesive layer 60b. By way of example, the member main body 60a of the protective member PM is formed into a rectangular shape with a predetermined thickness, and has a lower surface adhered onto the second installation surface 34b and an upper surface parallel to the lower surface. The protective member PM is formed into a size smaller than an area of the second installation surface 34b and provided within a range of the second installation surface 34b. A through-hole, not shown, opposed to the caulking hole 37 is provided in the protective member PM. The protective member PM is adhered onto a region except for the caulking hole 37 of the second installation surface 34b.

A thickness of the protective member PM, i.e., a sum of a thickness of the member main body 60a and a thickness of the adhesive layer 60b is set generally equal to a height of the stepped portion 36b and set to, for example, 0.2 mm. In a state of fixing the protective member PM onto the second installation surface 34b, the upper surface of the protective member PM is located generally on the same plane as that on which the second principal surface 30b of the arm 30A is located.

In the uppermost arm 30B, the protective member PM is provided on the installation surface located outside, i.e., first installation surface 34a opposed to the arm 30A out of the installation surfaces 34a and 34b of the caulking portion 33. The protective member PM is identical in configurations to the protective member PM provided on the arm 30A. The member main body 60a of the protective member PM is adhered onto the first installation surface 34a by the adhesive layer 60b such as the double-sided tape. By way of example, the thickness of the protective member PM, i.e., the sum of the thickness of the member main body 60a and the thickness of the adhesive layer 60b is set generally equal to a height of the stepped portion 36a and set to, for example, 0.2 mm. In a state of fixing the protective member PM onto the first installation surface 34a, the upper surface of the protective member PM is located generally on the same plane as that on which the first principal surface 30a of the arm 30B is located.

In the multi-actuator configured as described above, the support shaft 26 is distorted near an axially central portion thereof when an impact acts on the HDD. As a result, there is a probability that the arm 30A in the first actuator assembly 22A and the arm 30B in the second actuator assembly 22B disposed proximate to each other collide with each other. According to the present embodiment, the protective members PM are provided on the tip end portions of the arms 30A and 30B. As a result of this configuration, even when such an impact acts on the HDD, then each protective member PM contacts the counterpart arm 30A or 30B or the protective members PM contact each other, and direct contact between the arms 30A and 30B is prevented. This can prevent generation of metal powder, i.e., metal contamination caused by the contact between the arms 30A and 30B formed from aluminum. Even when the protective member PM formed from the material, for example, resin different from aluminum contacts the arm 30A or 30B, the metal contamination is either not generated or greatly reduced. Even when the protective members PM contact each other, the metal contamination is not generated.

Furthermore, installing the upper surface, i.e., outer surface of each protective member PM generally on the same plane as that on which the principal surface of the arm 30A or 30B is provided makes it possible to avoid the contact between the arms 30A and 30B with a shock-loading resistance of the HDD hardly reduced.

As described above, according to the first embodiment, it is possible to obtain the disk device capable of improving reliability by preventing the contact between the arms in the actuators and either preventing or suppressing the generation of the metal contamination.

It is noted that a shape, dimensions, and the like of the protective member PM are not limited to those in the first embodiment and may be variously modified. The material for forming the protective member PM is not limited to the resin or a synthetic resin and may be selected from among other freely selected materials. Using the material for forming the protective member PM different from the material, e.g., aluminum for forming the arms 30 makes it possible to obtain an effect of preventing the generation of the metal contamination.

HDDs according to other embodiments will next be described. In the other embodiments described hereinafter, the same portions as those in the first embodiment described above are denoted by the same reference signs and detailed descriptions thereof are either omitted or simplified, and portions different from those in the first embodiment are mainly described in detail.

Second Embodiment

Figure 6:
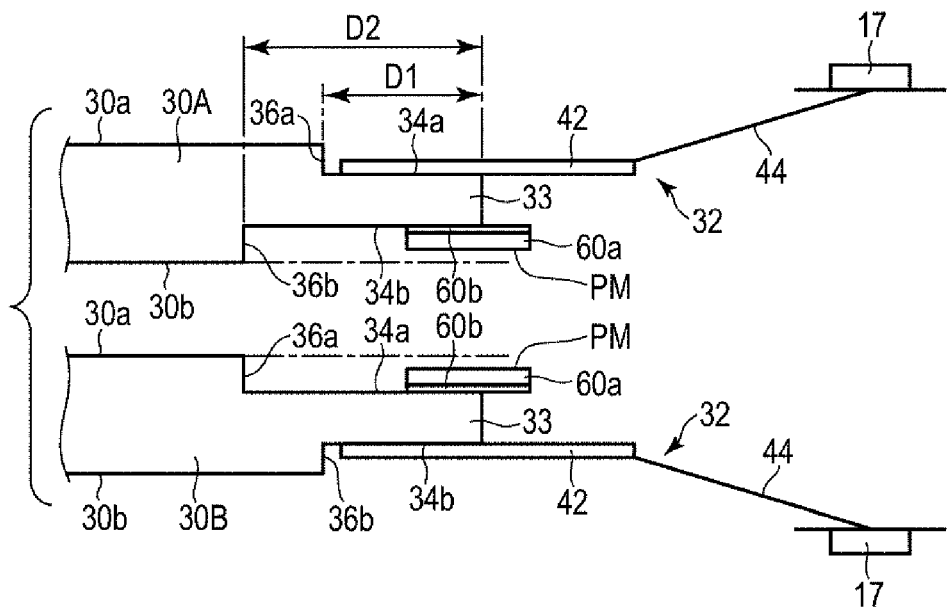
FIG. 6 is a side view schematically showing tip end portions of two arms opposed to each other as well as suspension assemblies in actuator assemblies in an HDD according to a second embodiment.

FIG. 6 is a side view schematically showing two arms adjacent to and opposed to each other as well as suspension assemblies in actuator assemblies in the HDD according to a second embodiment.

As shown in FIG. 6, according to the second embodiment, in the caulking portion 33 provided in the tip end portion of the lowermost arm 30A in the first actuator assembly 22A, an area of the second installation surface 34b, which is opposed to the second actuator assembly 22B, is set larger than an area of the first installation surface 34a. Byway of example, the second installation surface 34b is made to extend toward the base end of the arm 30A in such a manner that a length D2 from the tip end of the caulking portion 33 to the stepped portion 36b is larger than a length D1 from the tip end of the caulking portion 33 to the stepped portion 36a. By doing so, the stepped portion 36b prone to contact the other arm 30B is shifted toward the base end of the arm 30A.

The protective member PM is adhered onto the second installation surface 34b while being shifted toward the tip end of the caulking portion 33, and part of the protective member PM projects from the tip end of the caulking portion 33. It is thereby possible to move a point of contact with the other protective member PM toward the tip end of the arm 30A.

The thickness of the protective member PM is set smaller than the height of the stepped portion 36b. By setting so, the upper surface of the protective member PM descends from the second principal surface 30b of the arm 30A, that is, is located to be shifted toward the second installation surface 34b rather than the second principal surface 30b.

The caulking portion (fixation portion) 33 and the protective member PM provided on the tip end portion of the uppermost arm 30B in the second actuator assembly 22B are formed similarly to the caulking portion 33 and the protective member PM of the arm 30A described above. That is, in the caulking portion 33 of the arm 30B, the area of the first installation surface 34a, which is opposed to the first actuator assembly 22A, is set larger than the area of the second installation surface 34b which is on the opposite side, and the stepped portion 36a is located to be shifted toward the base end of the arm 30B, compared with the stepped portion 36b. The protective member PM is adhered onto the first installation surface 34a in a state in which part of the protective member PM projects from the tip end of the caulking portion 33. The protective member PM has the thickness smaller than the height of the stepped portion 36a.

Other configurations of the multi-actuator and the HDD according to the second embodiment are identical to the multi-actuator and the HDD according to the first embodiment described above.

According to the second embodiment configured as described above, by shifting the stepped portion 36b of the caulking portion 33 of the arm 30A toward the base end of the arm 30A and shifting the stepped portion 36a of the caulking portion 33 of the arm 30B toward the base end of the arm 30B, and by installing each protective member PM to be shifted toward the tip end of the caulking portion 33, it is possible to provide a structure that makes it difficult for the arms 30A and 30B to contact each other. Furthermore, the upper surface of each protective member PM can be provided at a lower position than the second or first principal surface 30b or 30a; thus, it is possible to avoid the contact between the arms 30A and 30B without reducing a shock resistance. Thus, according to the second embodiment, similarly to the first embodiment, it is possible to obtain the disk device capable of preventing the generation of the metal contamination and improving reliability.

Third Embodiment

Figure 7:
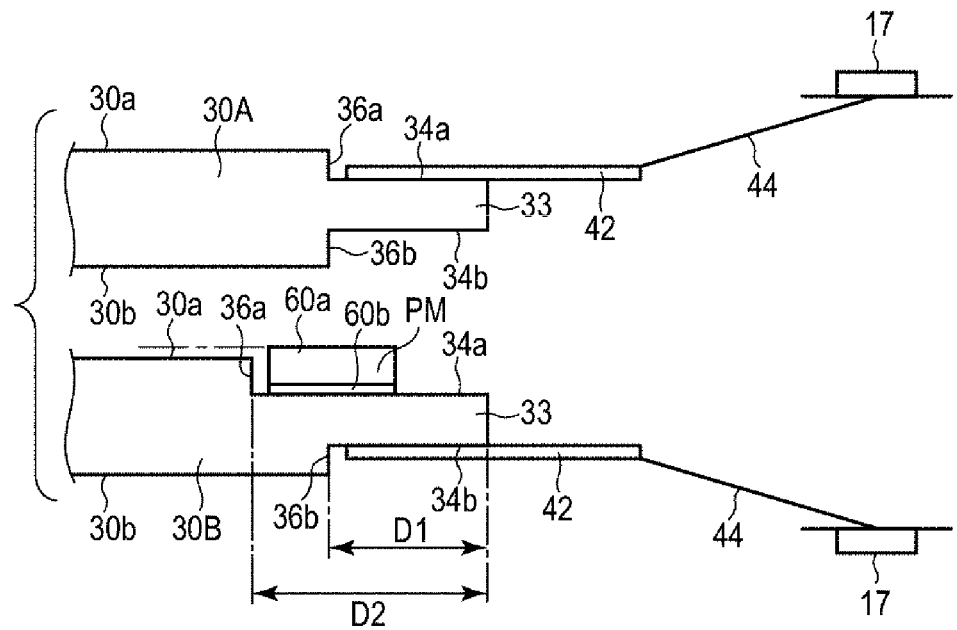
FIG. 7 is a side view schematically showing tip end portions of two arms opposed to each other as well as suspension assemblies in actuator assemblies in an HDD according to a third embodiment.

FIG. 7 is a side view schematically showing two arms adjacent to and opposed to each other as well as suspension assemblies in the actuator assemblies in the HDD according to a third embodiment.

As shown in FIG. 7, according to the third embodiment, the protective member PM is provided only on one of the lowermost arm 30A in the first actuator assembly 22A and the uppermost arm 30B in the second actuator assembly 22B. In the present embodiment, the protective member PM is provided only on, for example, the arm 30B.

In the caulking portion (fixation portion) 33 provided in the tip end portion of the arm 30B, the area of the first installation surface 34a, which is opposed to the first actuator assembly 22A, is set larger than the area of the second installation surface 34b. By way of example, the first installation surface 34a is made to extend toward the base end of the arm 30B in such a manner that a length D2 from the tip end of the caulking portion 33 to the stepped portion 36a is larger than a length D1 from the tip end of the caulking portion 33 to the stepped portion 36b.

The protective member PM is adhered onto the first installation surface 34a and shifted toward the base end of the arm 30B. That is, the protective member PM is disposed at a position moved from the tip end of the caulking portion 33 toward the stepped portion 36a, and located to be adjacent to the stepped portion 36a. The protective member PM is thereby located to be opposed to the stepped portion 36b of the other arm 30A.

Similarly to the first embodiment, the protective member PM has the member main body 60a formed from the resin and the adhesive layer 60b placed on the lower surface of the member main body 60a, and the protective member PM is adhered onto the first installation surface 34a by the adhesive layer 60b. In addition, the thickness of the protective member PM is set slightly larger than the height of the stepped portion 36a. The upper surface of the protective member PM is thereby located on a plane higher than the first principal surface 30a of the arm 30B in a direction of the other arm 30A.

Other configurations of the multi-actuator and the HDD according to the third embodiment are identical to the multi-actuator and the HDD according to the first embodiment described above.

According to the third embodiment configured as described above, the protective member PM provided only on one arm 30B is opposed to the stepped portion 36b of the other arm 30A. As a result of this configuration, when the arms 30A and 30B are displaced by an impact or the like, the protective member PM abuts on the stepped portion 36b of the arm 30A, and it is possible to avoid the contact between the arms 30A and 30B. It is thereby possible to prevent the generation of the metal contamination and improve reliability.

Moreover, providing the protective member PM only on one arm makes it possible to reduce unevenness of gaps of portions of contact and, at the same time, to reduce the number of components of the actuator assemblies by one.

Fourth Embodiment

Figure 8:
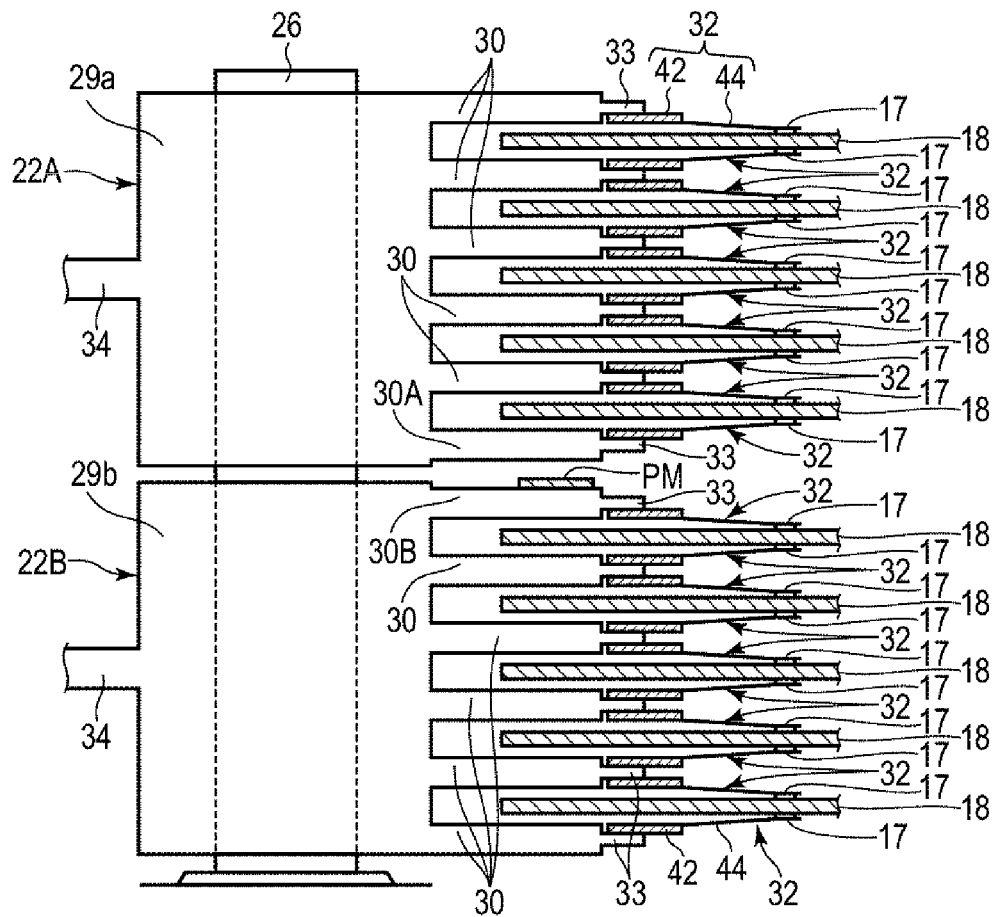
FIG. 8 is a side view schematically showing actuator assemblies in an HDD according to a fourth embodiment.
Figure 9:
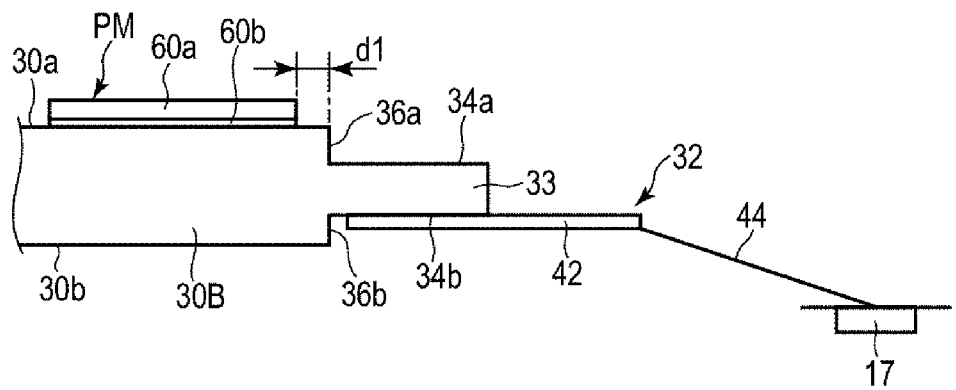
FIG. 9 is a partially enlarged side view schematically showing the actuator assembly in the HDD according to the fourth embodiment.

FIG. 8 is a side view schematically showing actuator assemblies in the HDD according to a fourth embodiment, and FIG. 9 is a side view schematically showing the tip end portion of the arm and the suspension assembly in the HDD according to the fourth embodiment.

As shown in FIG. 8, according to the fourth embodiment, the protective member PM is provided only on one of the lowermost arm 30A in the first actuator assembly 22A and the uppermost arm 30B in the second actuator assembly 22B. In the present embodiment, the protective member PM is provided only on, for example, the arm 30B.

As shown in FIG. 9, according to the present embodiment, the protective member PM is provided on the first principal surface 30a in the vicinity of the tip end portion of the arm 30B. The protective member PM has the plate-like member main body 60a formed from the material, e.g., the synthetic resin, different from the material, e.g., aluminum, for forming the arms 30, and the adhesive layer 60b placed on the lower surface of the member main body 60a. The protective member PM is adhered onto the first principal surface 30a of the arm 30B, that is, the principal surface 30a opposed to the lowermost arm 30A in the first actuator assembly 22A by the adhesive layer 60b.

The protective member PM is adjacent to the stepped portion 36a in such a manner that a distance dl between the stepped portion 36a and one end of the protective member PM is equal to or smaller than 0.2 mm in the tip end portion of the arm 30B. The protective member PM may either be superimposed on the stepped portion 36a or extend beyond the stepped portion 36a toward the tip end of the arm 30B.

Other configurations of the multi-actuator and the HDD according to the fourth embodiment are identical to the multi-actuator and the HDD according to the first embodiment described above.

According to the fourth embodiment configured as described above, the protective member PM provided only on one arm 30B is disposed in the vicinity of the stepped portion 36a and is opposed to the other arm 30A. As a result of this configuration, when the arms 30A and 30B are displaced by an impact or the like, the protective member PM abuts on the other arm 30A, and it is possible to avoid the contact between the arms 30A and 30B. It is thereby possible to prevent the generation of the metal contamination and improve reliability.

Providing the protective member PM only on one arm makes it possible to reduce unevenness of gaps of portions of contact and, at the same time, to reduce the number of components of the actuator assemblies by one.

In the fourth embodiment, the protective member PM may be configured to also serve as a damper. For example, in FIG. 9, the protective member PM can be configured as the damper by forming the member main body 60a of the protective member PM from a material, e.g., stainless steel, different from the material for the arms 30 and providing the adhesive layer 60b as a viscoelastic layer. It is noted that it is possible to prevent the generation of the metal contamination even when stainless steel for forming the member main body 60a comes in contact with the aluminum arm 30A. Configuring the protective member PM to also serve as the damper makes it possible to reduce the number of components of the actuator assemblies.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

For example, several elements may be eliminated from all the elements shown in the embodiments. Furthermore, the elements described in the different embodiments may be combined as appropriate.

The number of the head actuator assemblies into which the multi-actuator is split is not limited to two, and the multi-actuator may be split into three or more actuator assemblies. The number of magnetic disks is not limited to ten and may be equal to or smaller than nine or equal to or greater than eleven, and the numbers of arms and head suspension assemblies and the number of magnetic heads may be increased or decreased depending on the number of provided magnetic disks.

The shape and the dimensions of the protective member PM may be variously changed without being limited to those in the embodiments described above. The material for the member main body in the protective member PM is not limited to the resin or stainless steel and may be selected from among various other materials on condition that the material differs from the material for forming the arms.

Likewise, materials, shapes, magnitudes, and the like of the elements of the disk device may be variously changed as needed without being limited to those in the embodiments described above.

What is claimed is:

1. A disk device comprising:
    a plurality of disk-like recording media each of which is rotatable;
    a plurality of heads processing information to and from the recording media;
    a first actuator assembly having a first actuator block that is supported to be rotatable about a support shaft, a plurality of arms that extend from the first actuator block, and a plurality of suspension assemblies each of which is mounted to a tip end portion of each of the arms and each of which supports one of the heads;
    a second actuator assembly having a second actuator block that is supported to be rotatable about the support shaft and that is separated from the first actuator block by a gap, a plurality of arms that extend from the second actuator block, and a plurality of suspension assemblies each of which is mounted to the tip end portion of each of the arms and each of which supports one of the heads; and
    a protective member that is provided on the tip end portion of at least one of a first arm, which is one of the arms that extend from the first actuator block that is closest to the second actuator assembly and a second arm, which is one of the arms that extend from the second actuator block that is closest to the first actuator assembly, and that is formed from a material different from a material for the arms, wherein
    each of the arms that extend from the first and second actuator blocks is formed into a plate shape having first and second principal surfaces opposed to each other, and the tip end portion of said each of the arms includes a first installation surface that extends from the first principal surface via a stepped portion and a second installation surface that extends from the second principal surface via a stepped portion, and
    the protective member is provided on at least one of the second installation surface of the first arm and the first installation surface of the second arm.

2. The disk device according to claim 1, wherein the protective member is provided on each of the second installation surface of the first arm and the first installation surface of the second arm.

3. The disk device according to claim 2, wherein the protective member provided on the second installation surface of the first arm has a lower surface fixed onto the second installation surface and an upper surface that is located generally on a same plane as a plane of the second principal surface of the first arm, and the protective member provided on the first installation surface of the second arm has an upper surface fixed onto the second installation surface and a lower surface that is located generally on a same plane as a plane of the first principal surface of the second arm.

4. The disk device according to claim 2, wherein the second installation surface of the first arm has a larger area than the first installation surface of the first arm, and the first installation surface of the second arm has a larger area than the second installation surface of the second arm, and
    the protective member on the first arm extends beyond the tip end portion of the first arm and the protective member on the second arm extends beyond the tip end portion of the second arm.

5. The disk device according to claim 1, wherein the protective member is provided only on one of the second installation surface of the first arm and the first installation surface of the second arm.

6. The disk device according to claim 5, wherein the protective member is provided on the second installation surface of the first arm, and
    the protective member has a lower surface fixed onto the second installation surface and an upper surface that is located generally on a same plane as a plane of the second principal surface of the first arm.

7. The disk device according to claim 6, wherein the second installation surface of the first arm has a larger area than the first installation surface of the first arm.

8. The disk device according to claim 1, wherein the protective member has a thickness of about 0.2 mm.

9. The disk device according to claim 1, wherein the protective member includes a member main body that is formed from a material different from a material for the arms and an adhesive layer by which the protective member is adhered onto one of the arms.

10. The disk device according to claim 1, wherein the protective member includes a member main body that is formed from a metal material different from a material for the arms and a viscoelastic layer by which the protective member is adhered onto one of the arms.

11. A disk device comprising:
    a plurality of disk-like recording media each of which is rotatable;
    a plurality of heads processing information to and from the recording media;
    a first actuator assembly having a first actuator block that is supported to be rotatable about a support shaft, a plurality of arms that extend from the first actuator block, and a plurality of suspension assemblies each of which is mounted to a tip end portion of each of the arms and each of which supports one of the heads;
    a second actuator assembly having a second actuator block that is supported to be rotatable about the support shaft and that is separated from the first actuator block by a gap, a plurality of arms that extend from the second actuator block, and a plurality of suspension assemblies each of which is mounted to the tip end portion of each of the arms and each of which supports one of the heads; and
    a protective member that is provided on a surface of a first arm that faces the second actuator assembly, and that is formed from a material different from a material for the arms, wherein the first arm is one of the arms that extend from the first actuator block that is closest to the second actuator assembly, wherein each of the arms that extend from the first and second actuator blocks is formed into a plate shape having a first principal surface and a second principal surface opposed to each other, and the tip end portion of said each of the arms includes a first installation surface that extends from the first principal surface via a stepped portion and a second installation surface that extends from the second principal surface via a stepped portion, and the protective member is provided on the second principal surface of the first arm.

12. The disk device according to claim 11, wherein the thickness of the protective member is 0.2 mm.

13. The disk device according to claim 12, wherein the protective member includes a member main body that is formed from a material different from a material for the arms and an adhesive layer by which the protective member is adhered onto one of the arms.

14. The disk device according to claim 12, wherein the protective member includes a member main body that is formed from a metal material different from a material for the arms and a viscoelastic layer by which the protective member is adhered onto one of the arms.

* * * * *